United States Patent
Takahashi et al.

(10) Patent No.: US 7,049,016 B2
(45) Date of Patent: May 23, 2006

(54) FUEL CELL SYSTEM AND ITS STARTUP CONTROL

(75) Inventors: Shinichi Takahashi, Vernon, CT (US); Koudai Yoshizawa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 400 days.

(21) Appl. No.: 10/380,432

(22) PCT Filed: Oct. 16, 2002

(86) PCT No.: PCT/JP02/10740

§ 371 (c)(1),
(2), (4) Date: Mar. 14, 2003

(87) PCT Pub. No.: WO03/041201

PCT Pub. Date: May 15, 2003

(65) Prior Publication Data

US 2003/0190512 A1    Oct. 9, 2003

(30) Foreign Application Priority Data

Nov. 8, 2001    (JP)    ............................. 2001-342937

(51) Int. Cl.
*H01M 8/04* (2006.01)

(52) U.S. Cl. .............................. 429/13; 429/24; 429/25

(58) Field of Classification Search ................... 429/13, 429/22, 23, 24, 25, 26, 37, 38, 39
See application file for complete search history.

(56) References Cited

U.S. PATENT DOCUMENTS

| | | | |
|---|---|---|---|
| 5,736,269 A * | 4/1998 | Okamoto et al. | 429/38 X |
| 6,562,503 B1 * | 5/2003 | Grasso et al. | 429/26 |
| 6,596,426 B1 * | 7/2003 | Yang et al. | 429/26 |
| 6,617,068 B1 * | 9/2003 | Dufner et al. | 429/13 X |
| 6,794,073 B1 * | 9/2004 | Breault et al. | 429/26 |

FOREIGN PATENT DOCUMENTS

| | | |
|---|---|---|
| EP | 0 833 400 A1 | 4/1998 |
| JP | 60241669 | 11/1985 |
| JP | 60241670 | 11/1985 |
| JP | 8-106914 | 4/1996 |

* cited by examiner

*Primary Examiner*—Stephen J. Kalafut
(74) *Attorney, Agent, or Firm*—McDermott Will & Emery LLP

(57) ABSTRACT

Before warmup of a fuel cell stack (1) is complete, a cooling water pressure of the fuel cell stack (1) is suppressed lower than the pressure used when the fuel cell system is run in the steady state. In this way, when the system is started from a low temperature state, water in a cathode (2) and anode (3) flows efficiently into the cooling water passage (9), and water clogging is prevented while maintaining a proper water balance in the fuel cell system.

14 Claims, 7 Drawing Sheets

FUEL CELL SYSTEM AND ITS STARTUP CONTROL

FIELD OF THE INVENTION

This invention relates to a fuel cell system, and more particularly to startup control when a fuel cell system is started from a low temperature state.

BACKGROUND OF THE INVENTION

A fuel cell system transforms the energy of fuel, directly into electrical energy. In the fuel cell system disclosed by JP8-106914A published by the Japanese Patent Office in 1996, in a pair of electrodes provided on either side of a membrane electrode, fuel gas containing hydrogen is supplied to the anode and an oxidizing agent gas containing oxygen is supplied to the cathode. Electrical energy is then extracted from the electrodes, using the electrochemical reactions produced on the surface of the membrane electrode, i.e., anode reaction: 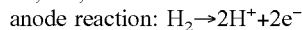
cathode reaction: 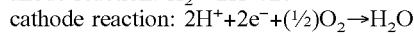

The fuel gas supplied to the anode, may be supplied directly from a hydrogen storage device, or fuel containing hydrogen may be reformed, and the reformed hydrogen-containing gas supplied to the anode. The fuel containing hydrogen may be natural gas, methanol or gasoline, and the oxidizing agent gas supplied to the cathode is generally air.

As it is necessary to keep the humidification state of the membrane electrode optimal in order to extract the performance of the membrane electrode in the fuel cell and enhance the power generation efficiency, the fuel gas and air introduced into the fuel cell is humidified. When reforming fuel gas and extracting hydrogen as mentioned above, water is used for reforming. Therefore, in order to use the fuel cell for vehicles, a water balance must be maintained within the fuel cell system including the fuel cell or reforming device. This is because the practicality of a fuel cell vehicle will fall remarkably if water runs short and it becomes necessary to supply pure water periodically.

There are two means of supplying water to the membrane electrode. One is the method of humidifying the fuel gas or air with a humidifier, and humidifying the membrane electrode using the moisture. Another is the method of connecting a cooling water passage to the anode and cathode in the fuel cell via a bipolar plate comprising a porous material, and supplying water to the membrane electrode from the cooling water to humidify the membrane electrode. Since the latter method does not need a humidifier for fuel gas and air, there is an advantage in that the system construction is simpler.

SUMMARY OF THE INVENTION

When starting the fuel cell system at low temperature, the water generated inside the fuel cell and the moisture in the fuel and air condense inside the fuel cell, and may block the fuel and air passage, which is called "water clogging." Water clogging reduces the efficiency of the fuel cell, and in particular, water clogging which occurs during startup lengthens the warm-up time of the fuel cell. As the frequency of startup operations is high in vehicles, the lengthening of the warm-up time of the fuel cell system reduces the usability of the fuel cell vehicle.

One of the methods of resolving water clogging is the blowing away of the condensed water by increasing the pressure of the fuel gas or air. However, if gas or air is delivered to the fuel cell at higher than ordinary operating pressure, the membrane electrode inside the fuel cell or the durability of the sealing will be degraded, the performance of the fuel cell will be reduced and its life will be shortened. In the fuel cell for vehicles, although there are differences in the frequency of use, startup operations may be performed from hundreds of times to thousands of times, so the above decline of performance is remarkable. Also, the ability to vary the pressure of fuel gas and air makes the system construction complicated.

Another method is to heat the fuel cell stack itself. However, the heating of the fuel cell stack makes the system complex. If the energy required for heating becomes large, the fuel economy of the vehicle decreases. Further, the time required for heating is too long for the vehicle.

It is therefore an object of this invention to provide a fuel cell stack wherein a cooling water passage is connected to a fuel gas passage and air passage via a porous plate, wherein the water in the anode and cathode flow out efficiently to the cooling water passage during startup from low temperature, the water balance in the fuel cell stack is maintained, and the problem of clogging is resolved.

In order to achieve above object, this invention provides a fuel cell system, comprising a fuel cell stack wherein a cooling water passage and an electrode are connected via a porous plate through which water can pass, a pressure adjusting device which adjusts the pressure of cooling water in the cooling water passage, and a controller. The controller functions to determine whether warmup of the fuel cell stack is complete based on the running state of the fuel cell stack, and before warmup of the fuel cell stack is complete, control the pressure adjusting device to decrease the cooling water pressure lower than the cooling water pressure after warmup is complete.

According to an aspect of this invention, this invention provides a startup method for a fuel cell system including a fuel cell stack wherein a cooling water passage and an electrode are connected via a porous plate through which water can pass and a pressure adjusting device which adjusts the pressure of cooling water in the cooling water passage, the method comprising determining whether warmup of the fuel cell stack is complete based on the running state of the fuel cell stack, and before warmup of the fuel cell stack is complete, controlling the pressure adjusting device to decrease the cooling water pressure lower than the cooling water pressure after warmup is complete.

The details as well as other features and advantages of this invention are set forth in the remainder of the specification and are shown in the accompanying drawings.

DESCRIPTION OF THE PREFERRED EMBODIMENTS

Figure 1:
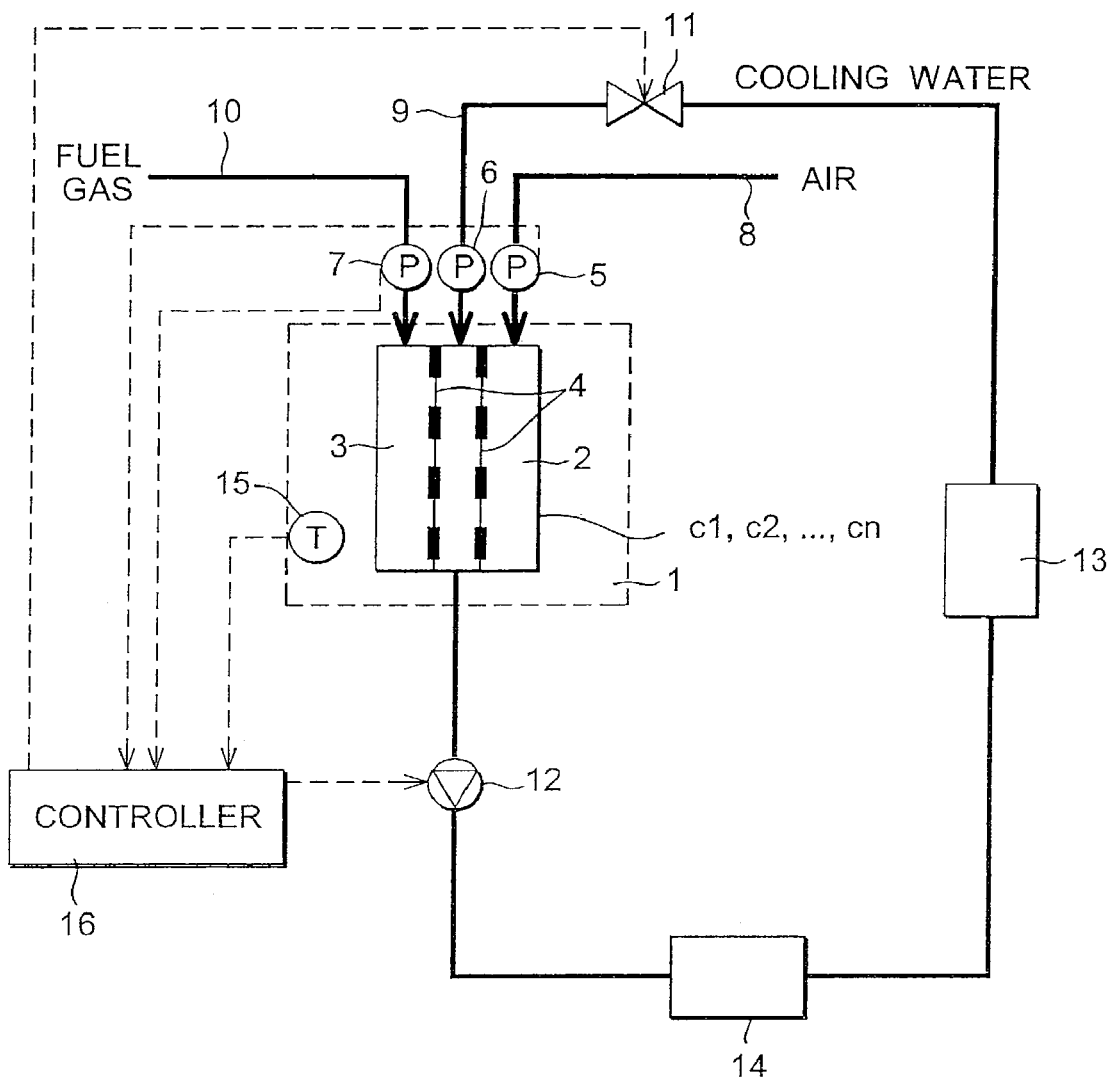
FIG. 1 is a block diagram of a fuel cell system relating to this invention.

Referring to FIG. 1 of the drawings, a fuel cell system relating to this invention is provided with a fuel cell stack 1 comprising plural cells c1, c2, . . . , cn, pressure sensors 5, 6, 7, a cooling water pump 12, a cooling water tank 13, a heat exchanger 14 and a controller 16. A temperature sensor 15 for measuring the internal temperature Tsin of the fuel cell stack 1 is installed inside the fuel cell stack 1. Measurement signals from these sensors are input into the controller 16.

Pressure sensors 5, 6, 7 measure the pressure in an air passage 8 which supplies air, a cooling water passage 9 which supplies cooling water and a fuel gas passage 10 which supplies fuel gas to the fuel cell stack 1, in the vicinity of the inlet to the fuel cell stack 1.

The controller 16 comprises one, two or more microprocessors, a memory and an input/output interface. The controller 16 calculates a pressure difference $\Delta P$ between the cooling water passage 9 and electrodes, a cathode 2 and anode 3 at the inlet of the fuel cell stack 1, from the signals from the pressure sensors 5, 6, 7. When the system is started, the controller 16 determines a pressure Pcw of cooling water according to the internal temperature Tsin of the fuel cell stack 1 detected by the temperature sensor 15, and controls the opening of a pressure reducing valve 11 and the rotation speed of the cooling water pump 12 so that a determined cooling water pressure Pcw is realized.

Specifically, before warm-up of the fuel cell stack 1 is complete, when the internal temperature Tsin of the fuel cell stack 1 is low and when water clogging by water condensed in the cathode 2 and anode 3 may occur, the pressure Pcw of cooling water is controlled to be lower than the pressure Pnormal used in the steady state after warmup is complete. In this way, the water condensed in the cathode 2 and anode 3 can be made to flow into the cooling water passage 9 efficiently using the pressure difference via the holes in the porous plate 4, and water clogging can be prevented. The cooling performance of the fuel cell stack 1 falls due to the lowering of the cooling water pressure Pcw. However, as this happens before warmup of the fuel cell stack 1 is completed, this does not pose a problem. Conversely, cooling of the fuel cell stack 1 can be suppressed and warmup can be promoted. As water does not flow out to the outside of the system from the air passage 8 and the fuel gas passage 10, the total amount of the water in the fuel cell stack 1 is kept constant, i.e., the water balance is maintained.

Subsequently, if the internal temperature Tsin of the fuel cell stack 1 rises and warmup is completed, water clogging cannot occur, so the pressure Pcw of cooling water is controlled to the pressure Pnormal in the steady state, and the cooling performance of the fuel cell stack 1 is ensured.

Figure 2:
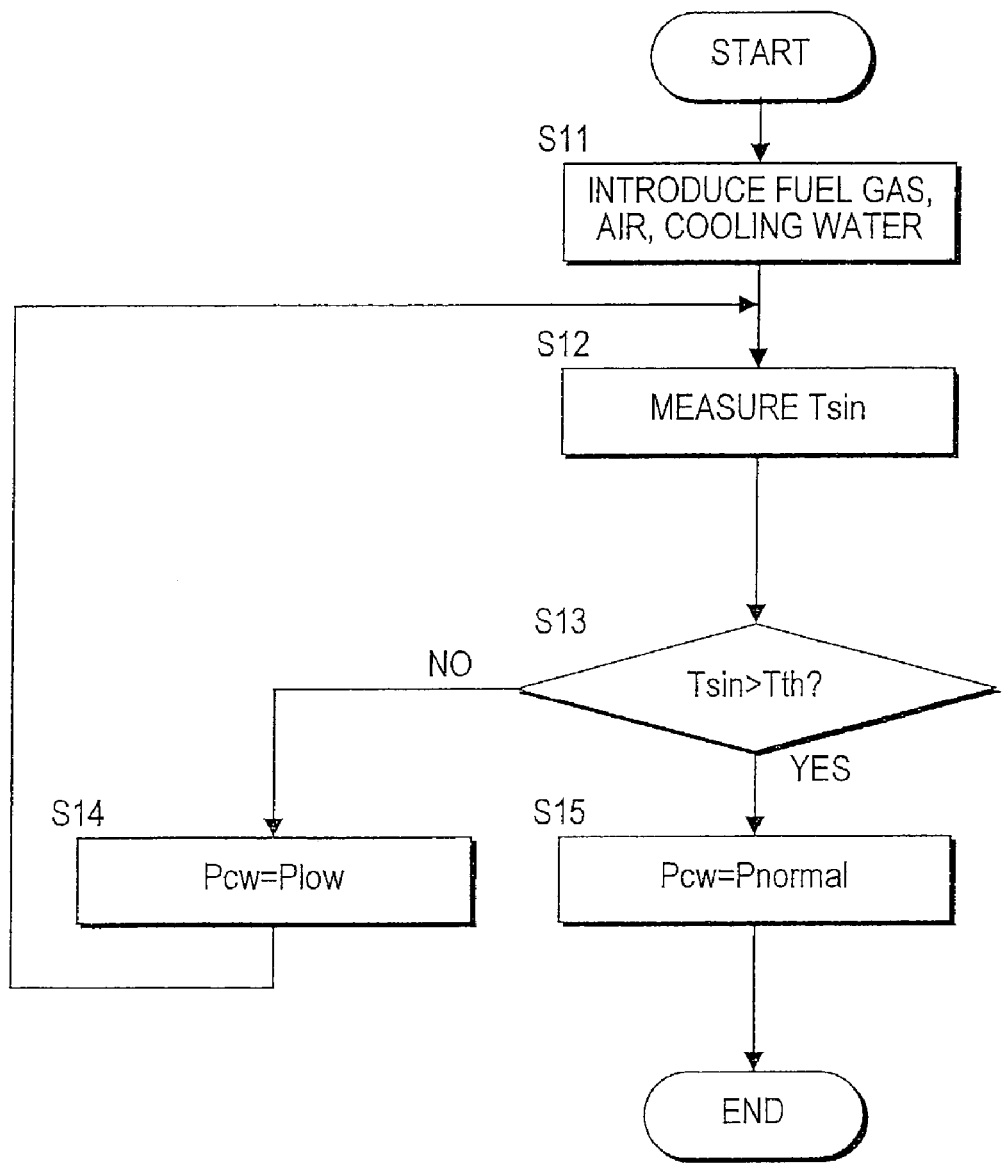
FIG. 2 is a flowchart showing the startup processing of the fuel cell system.

FIG. 2 is a flowchart showing startup processing, and this is performed at a predetermined time, for example every 10 milliseconds, by the controller 16.

First, in a step S11, fuel gas, air and cooling water start to be introduced to the fuel cell stack 1.

In a step S12, the internal temperature Tsin of the fuel cell stack 1 is measured. In a step S13, the measured internal temperature Tsin and the predetermined temperature Tth are compared. The predetermined temperature Tth is set according to the shape of the gas, air and cooling water passages, and the construction of the system. For example, it is set to the lowest temperature of the temperatures at which water clogging by the water condensed in the cathode 2 and anode 3 of the fuel cell stack 1 does not occur. The predetermined temperature Tth is set lower than the running temperature (about 60° C.–70° C.) of the fuel cell stack 1. From experiment, it was found that water clogging does not occur above 40° C., and it was possible to run the vehicle by setting the cooling water pressure Pcw to the pressure Pnormal, so the predetermined temperature Tth was set to 40° C.

It was determined that when the internal temperature Tsin is lower than the predetermined temperature Tth, water clogging occurs due to the water condensed in the cathode 2 and anode 3, so the routine proceeds to step S14, the water pressure Pcw is controlled to a predetermined low pressure power Plow, and the water condensed in the cathode 2 and anode 3 is made to flow out to the cooling water passage 9.

In order to increase the outflow efficiency of the condensed water, it is preferred to make the cooling water pressure Pcw as low as possible relative to the cathode 2 and anode 3. However, if the differential pressure $\Delta P$ between the cooling water passage 9 and the electrodes 2, 3 (cathode 2 and anode 3) becomes too large, fuel gas or oxidizing agent gas penetrates the cooling water passage 9. If the differential pressure $\Delta P$ is further increased, the internal structure of the membrane electrode or cell may break down. Thus, although the cooling water pressure Pcw is controlled to be as low as possible, the differential pressure $\Delta P$ between the cooling water passage 9 and the electrodes 2, 3 is controlled so that the pressure is higher than the minimum value of the pressure at which fuel gas or oxidizing agent gas penetrates the cooling water passage 9.

While the internal temperature Tsin of the fuel cell stack 1 is lower than the predetermined temperature Tth, the steps S12, S13, S14 are repeated. Subsequently, if warmup of the fuel cell stack 1 proceeds and the internal temperature Tsin exceeds the predetermined temperature Tth, it is determined that the condensation amount of the water in the fuel cell stack 1 is sufficiently small, water clogging by the condensed water does not occur, and the routine proceeds to a step S15.

When the routine proceeds to the step S15, the cooling water pressure Pcw is controlled to the pressure Pnormal normally used in steady running. Thereafter, the cooling water pressure Pcw is controlled to this ordinary pressure Pnormal, and the cooling performance of the fuel cell stack 1 is ensured.

Here, the differential pressure $\Delta P$ between the cooling water passage 9 and the electrodes 2, 3 (cathode 2 and anode 3) is calculated, and the minimum of the cooling water pressure Pcw is set based thereon. However, the pressure value for low cooling water pressure operation (fixed value) may be predefined, and the cooling water pressure Pcw changed over to this preset value immediately in the step S14 when low cooling water pressure running is performed. Thus, the system construction can be simplified and the control response can be improved.

As water may freeze when the internal temperature Tsin of the fuel cell stack 1 is lower than 0° C., when the detected internal temperature Tsin is lower than 0° C., a routine not shown is performed, and the internal water must be thawed by heating with a heater or circulating high temperature gas to the passage in the fuel cell stack 1 beforehand, and the aforesaid processing performed afterwards.

Moreover, as it is necessary to appropriately humidify the membrane electrode of the fuel cell stack 1, the humidification state of the membrane electrode is detected, and when the water content of the membrane electrode is smaller than a predetermined value, the pressure Pcw of the cooling water passage 9 is controlled to a second low pressure Plow2 (Plow<Plow2<Pnormal) which is lower than the normal running pressure Pnormal and higher than the pressure Plow set in the step S14. By adding such processing, even the movement of the moisture in the membrane electrode to the cooling water passage 9 can be prevented, and the humidification state of the membrane electrode can be maintained at a satisfactory level.

Figure 3:
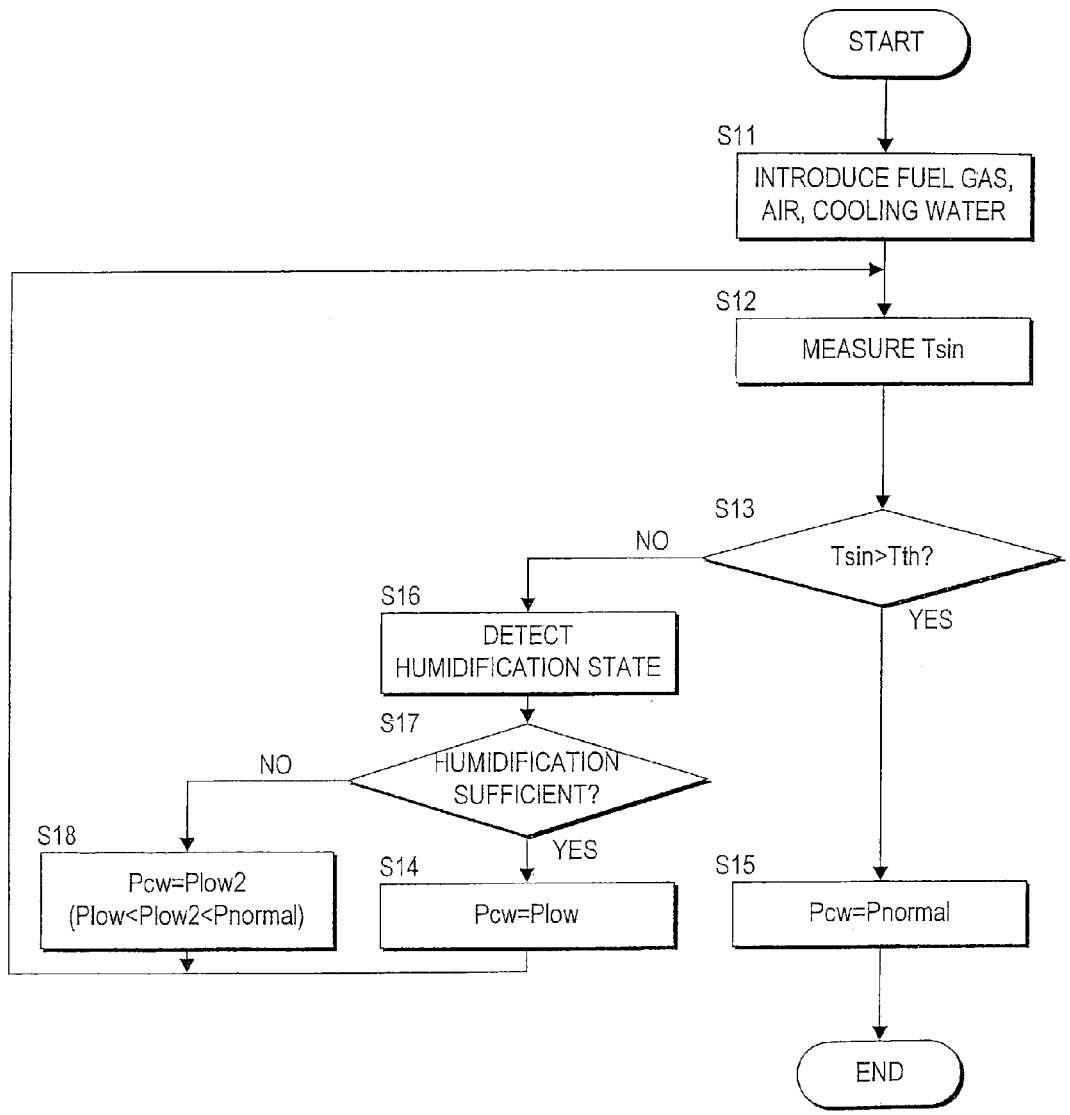
FIG. 3 is a flowchart showing the startup processing taking the humidification state of a membrane electrode into consideration.

FIG. 3 is a flowchart showing the startup processing when taking the humidification state of the membrane electrode into consideration. Steps S16–S18 are added to what was shown in FIG. 2.

The humidification state of the membrane electrode is detected in the step S16. The humidification state of the membrane electrode can be predicted from the state change of the fuel cell stack 1 such as the change of electromotive force and the reserved water amount in the water tank 13. More specifically, to predict this more directly, the temperature is detected for every cell forming the fuel cell stack 1, the temperature distribution of cells is measured as shown in the embodiment described below, and the prediction is based thereon.

When it is determined in the step S17 that humidification of the membrane electrode is not sufficient, the routine proceeds to the step S18, and the pressure Pcw of the cooling water passage 9 is controlled to the pressure Plow2 which is lower than the normal running pressure Pnormal and higher than the pressure set in the step S14.

Next, a second embodiment of this invention will be described.

Figure 4:
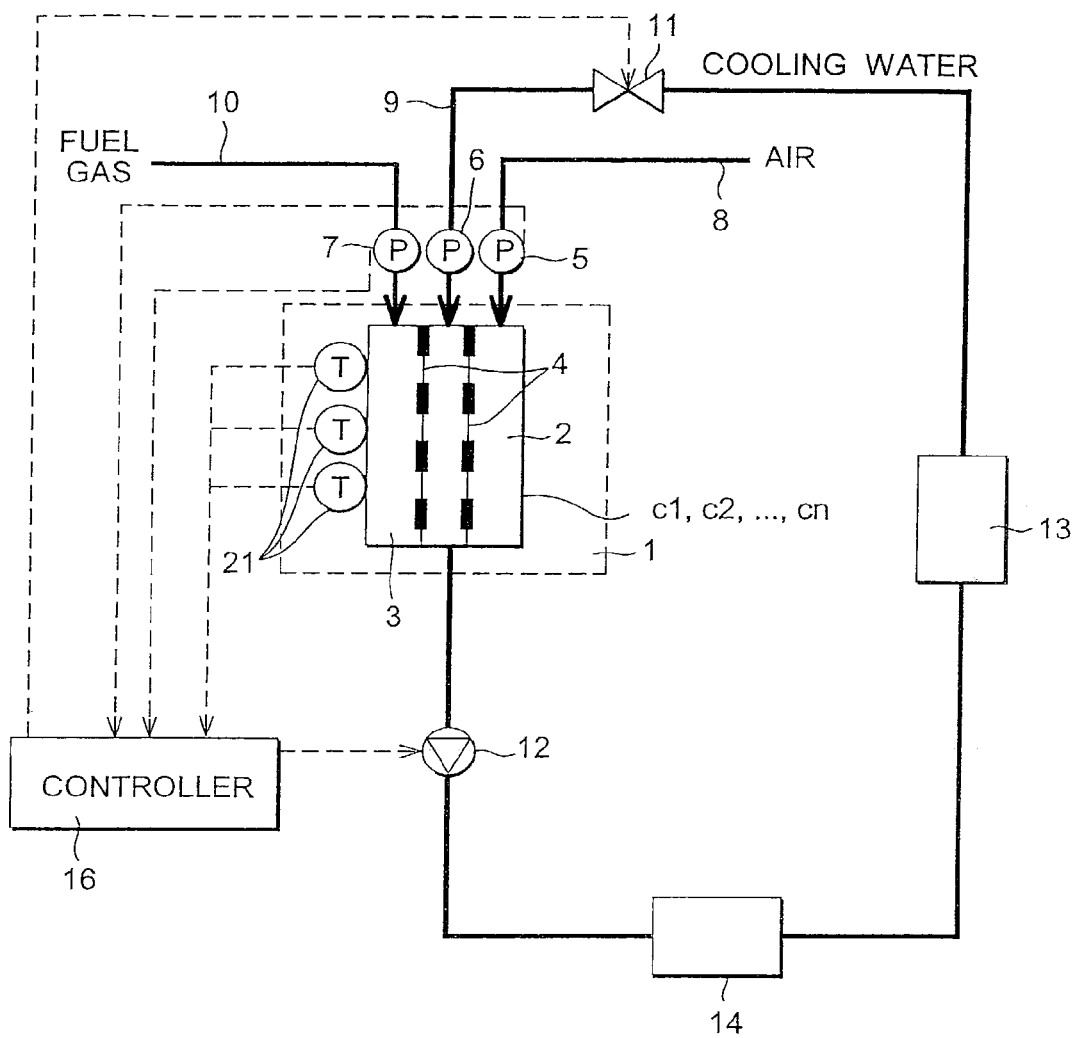
FIG. 4 is similar to FIG. 1, but is a block diagram of a fuel cell system according to the second embodiment.

FIG. 4 shows the construction of a fuel cell system of the second embodiment. Temperature sensors 21 are installed which measure the temperatures in each cell c1, c2, . . . , cn of the fuel cell stack 1, which is a difference from the first embodiment. For convenience, only three sensors 21 have been shown in FIG. 3, but there may be a larger or smaller number of the sensors 21 according to the number of the cells.

Moreover, the startup processings of the system performed by the controller 16 is also different. The controller 16 predicts water clogging from the temperature distribution of the cells, and performs pressure control of cooling water. The average of the cell temperatures is calculated, and the cooling water pressure Pcw is also controlled based on the differential pressure ΔP between the cooling water and the electrodes 2, 3 (cathode 2 and anode 3) at the inlet of the fuel cell stack, and the average Tcelave of cell temperature.

Specifically, the controller 16 predicts water clogging from the dispersion (bias) in the distribution of the cell temperatures. For example, there is a bias in a temperature distribution such as when the temperature of some cells is low and the possibility of water clogging is predicted, the pressure Pcw of cooling water is immediately reduced to the minimum valve Plow of pressure at which penetration of fuel gas or oxidizing agent gas into the cooling water passage 9 does not take place, and the outflow efficiency of water from the cathode 2 and anode 3 to the cooling water passage 9 is increased to the maximum so as to rapidly eliminate any water clogging.

Even after water clogging has been resolved, before warmup of the fuel cell stack 1 is complete, when the average temperature Tcelave of the cell is lower than the predetermined temperature Tth and there is a possibility that water clogging may occur in the fuel cell stack 1, the pressure Pcw of cooling water is controlled lower than the pressure Pnormal in steady running as in the preceding embodiment, and water in the cathode 2 and anode 3 is made to flow efficiently into the cooling water passage 9 via the holes in the porous plate 4.

Figure 5:
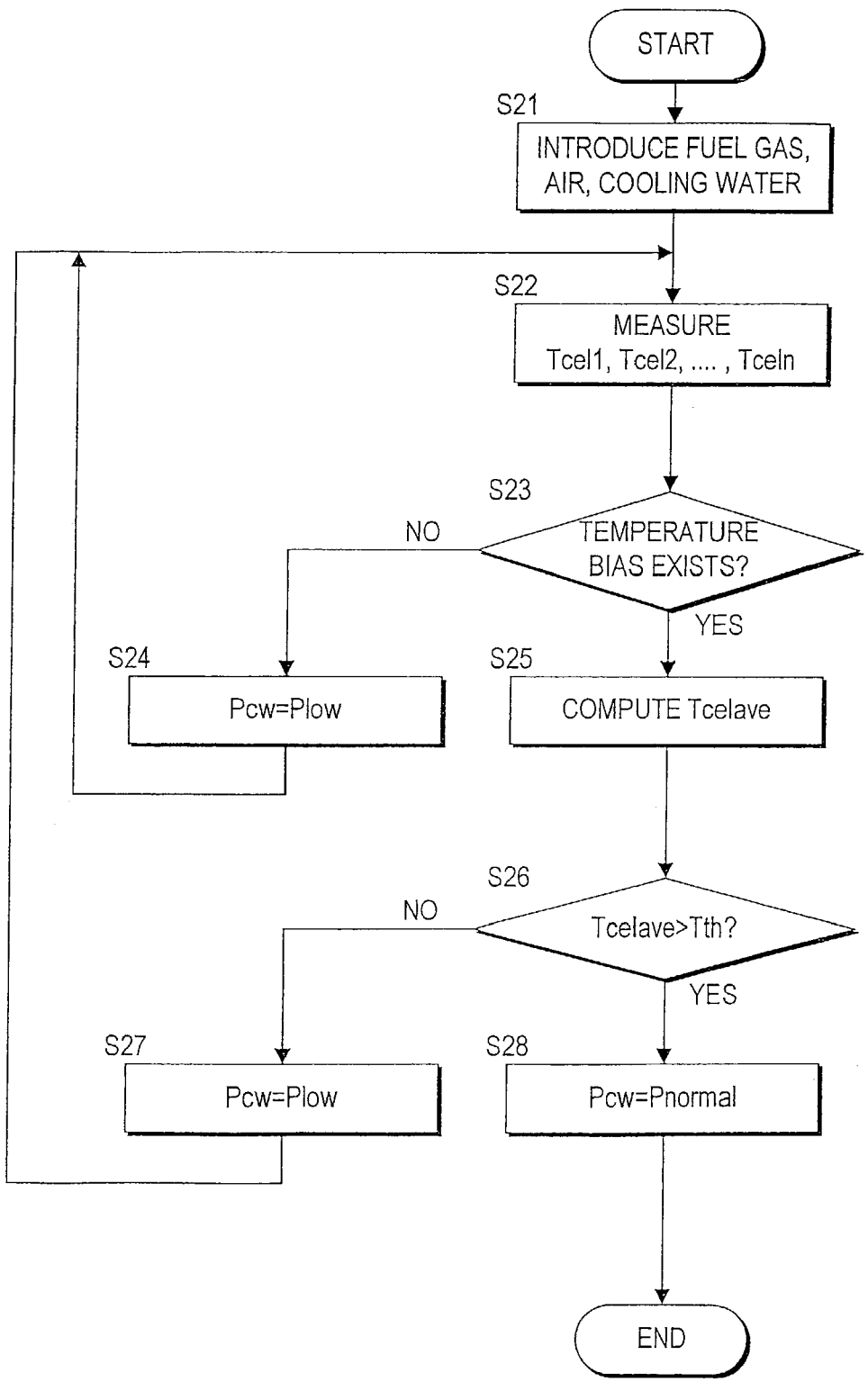
FIG. 5 is a flowchart showing the startup processing according to the second embodiment.

FIG. 5 is a flowchart showing startup processing of the fuel cell system, and is performed at a predetermined time, for example every 10 milliseconds, by the controller 16.

First, in a step S21, introduction of fuel gas, air and cooling water to the fuel cell stack 1 is started. In a step S22, the temperatures Tcel1, Tcel2, . . . , Tceln of the cells c1, c2, . . . , cn of the fuel cell stack 1, are measured.

In a step S23, water clogging is predicted from the distribution of cell temperature. When the temperature of only some cells is lower than the temperature of other cells, it is predicted that water clogging may occur in the cells at low temperature. When it is predicted that there is water clogging, the routine proceeds to a step S24, and the cooling water pressure Pcw is set to the minimum pressure Plow. The minimum pressure Plow is the minimum value of pressure at which penetration of fuel gas or oxidizing agent gas into the cooling water passage 9 does not take place, and is set based on the differential pressure ΔP between the cooling water passage 9 and the electrodes 2, 3 as in the preceding embodiment. By lowering the cooling water pressure Pcw to the minimum pressure Plow, the outflow of condensed water in the cathode 2 and anode 3 to the cooling water passage 9 is enhanced to the maximum, and water clogging can be eliminated at an early stage.

When it is determined that the bias of temperature distribution has disappeared and water clogging in the fuel cell stack 1 was eliminated, the routine proceeds to a step S25 and the average temperature Tcelave of the cells is calculated.

In a step S26, the average temperature Tcelave of the cells is compared with the predetermined temperature Tth (the minimum temperature of the temperatures at which water clogging due to the condensed water does not occur), and when the cell average temperature Tcelave is lower than the predetermined temperature Tth, the routine proceeds to a step S27, and the cooling water pressure Pcw is set lower than the pressure for steady running, Pnormal, as in the step S14 of the preceding embodiment. When the cell average temperature Tcelave subsequently reaches the predetermined temperature Tth, the routine proceeds to a step S28, and the cooling water pressure Pcw is set to the pressure used for steady running, Pnormal.

In this embodiment, the cell temperature is measured, and the presence or absence of water clogging is determined from the temperature distribution. When it is determined that there is water clogging, the cooling water pressure Pcw is lowered to the minimum pressure Plow, and priority is given to the outflow of water from the cathode 2 and anode 3 into the cooling water passage 9. Thereby, water clogging in the fuel cell stack 1 can be eliminated at an early stage. After water clogging is eliminated, the same startup processing can be performed as in the preceding embodiment according to the cell average temperature Tcelave, and thereafter, the fuel cell system can be started without water clogging.

Also in this embodiment, as in the first embodiment, the humidification state of the membrane electrode of the fuel cell stack 1 is predicted from the electromotive force etc., and if the humidification of the membrane electrode is not sufficient, the cooling water pressure Pcw is raised to Plow2 which is higher than the pressure Plow set in the step S27, movement of water into the cooling water passage 9 from the cathode 2 and anode 3 is suppressed, and humidification of the membrane electrode is assisted as in the first embodiment. In particular, in this embodiment, as the cell temperature distribution is detected, the humidification state of the membrane electrode can be predicted with high precision from the change of cell temperature distribution and electromotive force.

Next, a third embodiment of this invention will be described.

Figure 6:
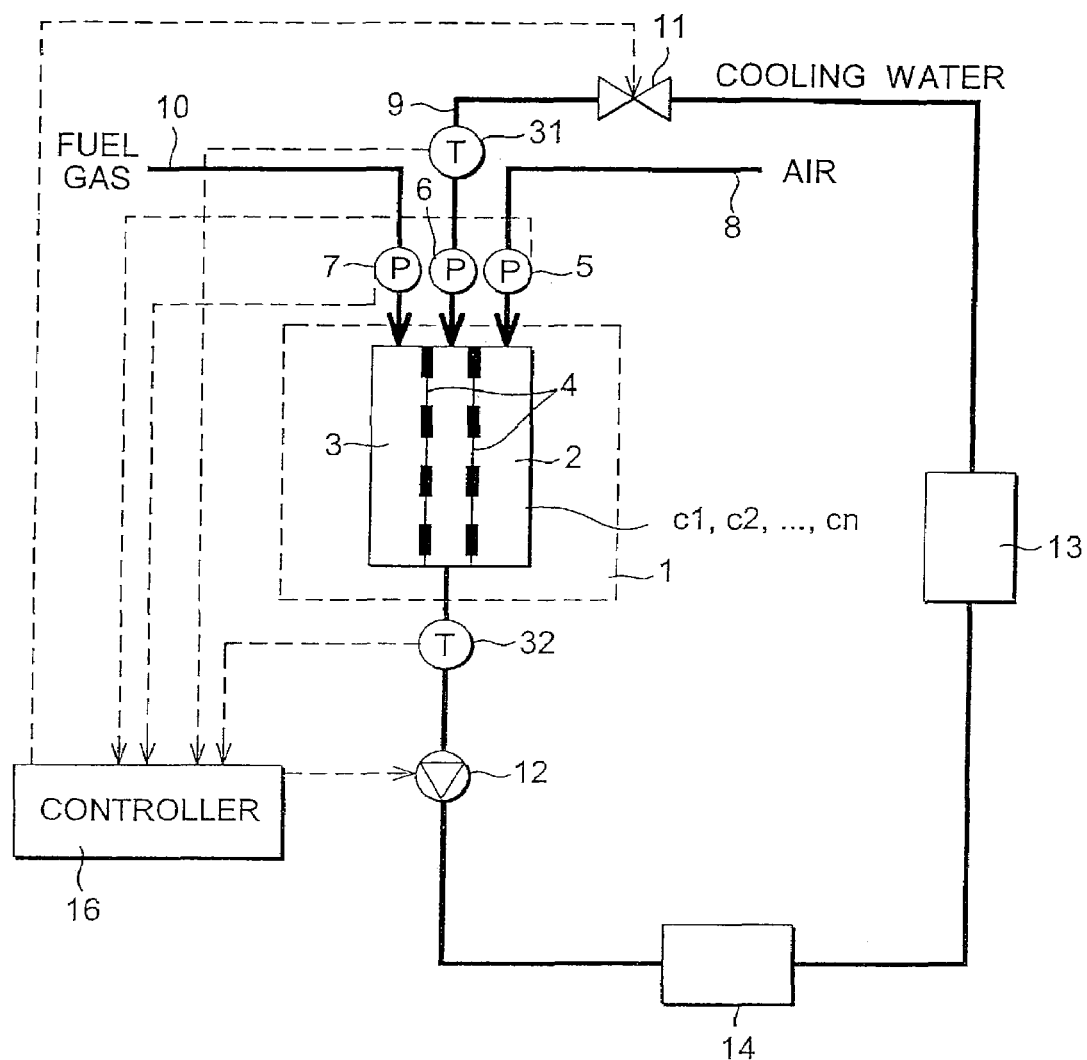
FIG. 6 is similar to FIG. 1, but is a block diagram of a fuel cell system according to the third embodiment.

FIG. 6 shows the construction of the fuel cell system of the third embodiment. This is essentially identical to the construction of the first embodiment, however temperature sensors 31, 32 are formed in the cooling water passage 9 near the inlet and outlet of the fuel cell stack 1, respectively. Also, the startup processing of the system performed by the controller 16 is also different.

The controller 16 calculates a temperature difference ΔT of the cooling water between the fuel cell inlet and outlet. From this temperature difference ΔT, the reaction status inside the fuel cell stack 1 can be grasped, water clogging can be estimated and cooling water pressure control performed. The temperature difference ΔT can be measured by installing temperature sensors 31, 32 at the fuel cell inlet and outlet, respectively, as shown in FIG. 6, or by installing a thermocouple in the cooling water passage 9. In both cases, temperature measurement can be performed more easily than by measuring the internal temperature of the fuel cell stack 1 by installing sensors inside the fuel cell stack 1.

Figure 7:
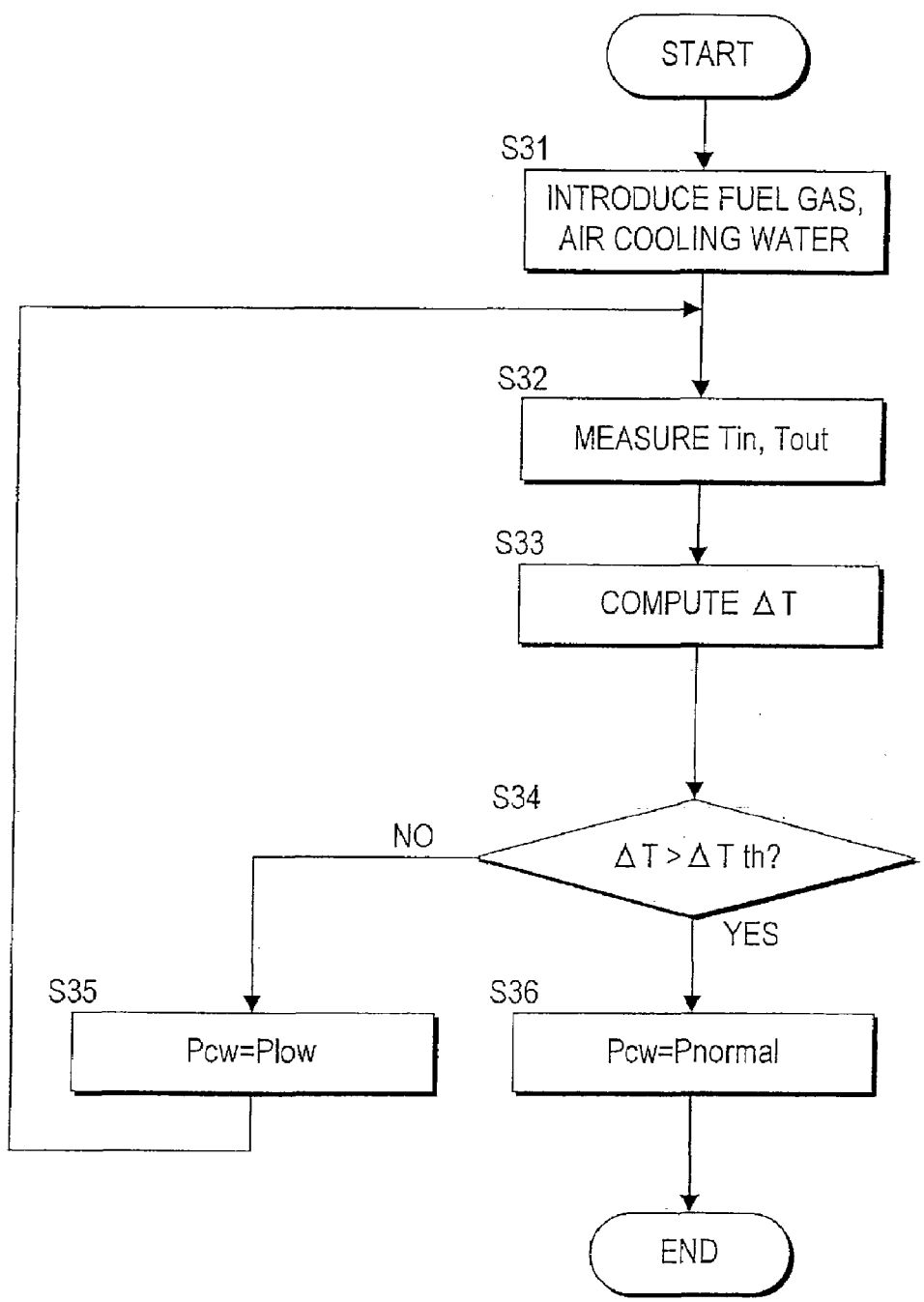
FIG. 7 is a flowchart showing the startup processing according to the third embodiment.

FIG. 7 is a flowchart showing startup processing of the fuel cell system, and is performed at a predetermined time, for example every 10 milliseconds, by the controller 16.

First, in a step S31, introduction of fuel gas, air and cooling water to the fuel cell stack 1 is started.

In a step S32, the cooling water temperatures Tin, Tout at the inlet and outlet of the fuel cell stack 1 are measured. In a step S33, the temperature difference ΔT of cooling water between the inlet and outlet of the fuel cell stack 1 is computed.

In a step S34, this temperature difference ΔT and a preset temperature difference ΔTth are compared. For example, if the outside atmospheric temperature is approximately 20° C. and the running temperature of the fuel cell stack 1 is approximately 60° C.–70° C., the temperature difference ΔTth is set to a value between 20° C.–50° C. When the temperature difference ΔT is smaller than ΔTth, it is determined that warmup of the fuel cell stack 1 is not complete and water clogging due to condensation of water may occur in the fuel cell stack 1, so the routine proceeds to a step S35, and the cooling water pressure Pcw is set to Plow (<Pnormal).

Subsequently, if warmup of the fuel cell stack 1 continues and the temperature difference ΔT becomes larger than ΔTth, it is assumed that warmup of the fuel cell stack 1 is complete, and the routine proceeds to a step S36. Thereafter, the cooling water pressure Pcw is controlled to the pressure Pnormal normally used for steady running.

Even if warmup completion of the fuel cell stack 1 is determined based on the temperature difference ΔT of cooling water at the inlet and outlet of the fuel cell stack 1, the same startup processing as in the preceding embodiment is possible.

Although the warmup state of the fuel cell stack 1 was determined here based on temperature difference ΔT of cooling water at the inlet and outlet of the fuel cell stack 1, the warmup state of the fuel cell stack 1 may be determined based on the temperature difference of fuel gas or air at the inlet and outlet of the fuel cell stack 1.

Further, the sensor at the inlet may be omitted, and the warmup state of the fuel cell stack 1 may be determined from the temperature rise of fluid (cooling water, fuel gas, or air) at the outlet. For example, if it is determined that warmup of the fuel cell stack 1 is complete when the temperature of cooling water at the outlet has risen to a predetermined temperature, the system construction is simplified and control is also simplified.

Moreover, also in this embodiment, the humidification state of the membrane electrode of the fuel cell stack 1 may be detected from the electromotive force etc., as in the preceding embodiment, and if the humidification of the membrane electrode is not sufficient, the cooling water pressure is raised to Plow2 which is higher than the pressure Plow set in the step S35, movement of water into the cooling water passage 9 from the cathode 2 and anode 3 is suppressed, and humidification of the membrane electrode is assisted.

The entire contents of Japanese Patent Application P2001-342937 (filed Nov. 8, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

INDUSTRIAL FIELD OF APPLICATION

This invention may be applied to various fuel cell systems including those of vehicles, and is useful for preventing water clogging when starting from a low temperature state, and enhancing startup of the fuel cell system.

What is claimed is:

1. A fuel cell system, comprising:
   a fuel cell stack wherein a cooling water passage and an electrode are connected via a porous plate through which water can pass,
   a pressure adjusting device which adjusts the pressure of cooling water in the cooling water passage, and
   a controller which functions to:
   determine whether warmup of the fuel cell stack is complete based on the running state of the fuel cell stack, and
   before warmup of the fuel cell stack is complete, control the pressure adjusting device to decrease the cooling water pressure lower than a predetermined cooling water pressure used in a steady state after warmup is complete.

2. The fuel cell system as defined in claim 1, wherein:
   the controller further functions, before warmup of the fuel cell stack is complete, to control the pressure adjusting device to set the cooling water pressure to a pressure at which gas at the electrode does not penetrate the cooling water passage.

3. The fuel cell system as defined in claim 1, wherein:
   the controller further functions, before warmup of the fuel cell stack is complete, to control the pressure adjusting device to set the cooling water pressure higher than a minimum value at which gas at the electrode does not penetrate the cooling water passage.

4. The fuel cell system as defined in claim 3, further comprising a sensor which detects a differential pressure between the cooling water passage and the electrode at the inlet of the fuel cell stack, and the controller further functions to determine the minimum value of the pressure at which gas at the electrode does not penetrate the cooling water passage according to the measured differential pressure.

5. The fuel cell system as defined in claim 1 further comprising a sensor which detects the temperature of the fuel cell stack, and the controller further functions to determine that warmup of the fuel cell stack is complete when the temperature of the fuel cell stack has risen to a predetermined temperature.

6. The fuel cell system as defined in claim 5, wherein:

the sensor which detects the temperature of the fuel cell stack detects the internal temperature of the fuel cell stack, and the controller further functions to determine that warmup of the fuel cell stack is complete when the internal temperature of the fuel cell stack has risen to a predetermined temperature at which water clogging in the fuel cell stack does not occur.

7. The fuel cell system as defined in claim 1, wherein:

the fuel cell stack includes plural cells, the system further comprises sensors which detect the temperatures of the cells, and the controller further functions to determine that warmup of the fuel cell stack is complete when the average temperature of the cells has risen to a predetermined temperature at which water clogging in the fuel cell stack does not occur.

8. The fuel cell system as defined in claim 7, wherein:

the controller further functions to predict water clogging in the fuel cell stack from the cell temperature distribution, and controls the pressure of the cooling water to be higher than a minimum value at which gas at the electrode does not penetrate the cooling water passage.

9. The fuel cell system as defined in claim 1, further comprising a sensor which detects the temperature of the fluid supplied to the fuel cell stack at the outlet of the fuel cell stack, and the controller further functions to determine that warmup of the fuel cell stack is complete when the temperature of the fluid at the outlet of the fuel cell stack has risen to a predetermined temperature.

10. The fuel cell system as defined in claim 1, further comprising a sensor which detects a temperature difference of the fluid supplied to the fuel cell stack at the inlet and outlet of the fuel cell stack, wherein:

the controller further functions to determine that warmup of the fuel cell stack is complete when the temperature difference of the fluid at the inlet and outlet of the fuel cell stack has increased to a predetermined temperature.

11. The fuel cell system as defined in claim 9, wherein the fluid is one of cooling water, fuel gas and air supplied to the fuel cell stack.

12. The fuel cell system as defined in claim 10, wherein the fluid is one of cooling water, fuel gas and air supplied to the fuel cell stack.

13. The fuel cell system as defined in claim 1, wherein the controller further functions to:

determine the humidification state of the membrane electrode of the fuel cell stack from the running state of the fuel cell stack, and when the membrane electrode is not sufficiently humidified, the pressure of the cooling water is increased to suppress outflow of water from the electrode to the cooling water passage.

14. A startup method for a fuel cell system including a fuel cell stack wherein a cooling water passage and an electrode are connected via a porous plate through which water can pass and a pressure adjusting device which adjusts the pressure of cooling water in the cooling water passage, the method comprising:

determining whether warmup of the fuel cell stack is complete based on the running state of the fuel cell stack, and before warmup of the fuel cell stack is complete, controlling the pressure adjusting device to decrease the cooling water pressure lower than a predetermined cooling water pressure used in steady state after warmup is complete.

* * * * *